United States Patent
Griswold et al.

(10) Patent No.: US 6,890,601 B2
(45) Date of Patent: May 10, 2005

(54) SILICONE PRESSURE SENSITIVE ADHESIVE COMPOSITION

(75) Inventors: Roy Griswold, Ballston Spa, NY (US); Frank J. Traver, Troy, NY (US); Jeffrey H. Wengrovius, Scotia, NY (US); Shaow B. Lin, Midland, MI (US)

(73) Assignee: General Electric Company, Pittsfield, MA (US)

( * ) Notice: Subject to any disclaimer, the term of this patent is extended or adjusted under 35 U.S.C. 154(b) by 169 days.

(21) Appl. No.: 10/315,386

(22) Filed: Dec. 10, 2002

(65) Prior Publication Data

US 2003/0166818 A1 Sep. 4, 2003

Related U.S. Application Data

(62) Division of application No. 09/638,409, filed on Aug. 11, 2000, now abandoned.
(60) Provisional application No. 60/213,700, filed on Jun. 23, 2000.

(51) Int. Cl.[7] .............................. B05D 3/02; C08L 83/00
(52) U.S. Cl. ........................ 427/387; 428/447; 525/477; 528/12; 528/34
(58) Field of Search ............................ 525/477; 528/34, 528/12, 14, 21; 428/447; 427/387; 156/329

(56) References Cited

U.S. PATENT DOCUMENTS

| | | |
|---|---|---|
| 2,676,182 A | 4/1954 | Daudt et al. |
| 2,814,601 A | 11/1957 | Currie et al. |
| 3,627,851 A | 12/1971 | Brady |
| 3,929,704 A | 12/1975 | Horning |
| 4,143,088 A | 3/1979 | Favre et al. |
| 4,535,141 A | 8/1985 | Kroupa |
| 4,774,297 A | 9/1988 | Murakami et al. |
| 4,831,070 A | 5/1989 | McInally et al. |
| 4,906,695 A | 3/1990 | Blizzard et al. |
| 4,988,779 A | 1/1991 | Medford et al. |
| 5,034,061 A | 7/1991 | Maguire et al. |
| 5,091,494 A | 2/1992 | Leistner et al. |
| 5,096,981 A * | 3/1992 | Traver .................. 525/475 |
| 5,100,976 A | 3/1992 | Hamada et al. |
| 5,128,394 A | 7/1992 | Traver et al. |
| 5,248,739 A | 9/1993 | Schmidt et al. |
| 5,340,887 A * | 8/1994 | Vincent et al. ............ 525/477 |
| 5,360,852 A | 11/1994 | Traver et al. |
| 5,441,811 A | 8/1995 | Lin et al. |
| 5,506,288 A | 4/1996 | Lin et al. |
| 5,561,203 A * | 10/1996 | Strong et al. ............. 525/477 |
| 5,580,915 A * | 12/1996 | Lin ....................... 524/264 |
| 5,973,061 A * | 10/1999 | Feder et al. .............. 524/588 |

FOREIGN PATENT DOCUMENTS

| | | |
|---|---|---|
| EP | 0 195 936 | 10/1986 |
| EP | 0 255 226 | 2/1988 |
| EP | 0 269 454 A2 | 6/1988 |
| EP | 537784 A | 4/1993 |
| EP | 537784 B | 3/1995 |

* cited by examiner

Primary Examiner—Margaret G. Moore
Assistant Examiner—Marc S. Zimmer
(74) Attorney, Agent, or Firm—Kenneth S. Wheelock

(57) ABSTRACT

A silicone pressure sensitive adhesive composition containing the condensation product of a silanol-functional silicone resin, wherein the resin contains M structural units according to the formula $R_3SiO_{1/2}$, wherein R is a monovalent hydrocarbon radical, and Q structural units according to the formula $SiO_{4/2}$ in a ratio of M units to Q units of less than 1.1:1, a silanol-functional polydiorganosiloxane gum, and a crosslinker exhibits high tack and high lap shear strength.

11 Claims, No Drawings

SILICONE PRESSURE SENSITIVE ADHESIVE COMPOSITION

CROSS-REFERENCE TO RELATED APPLICATIONS

This application is a Divisional Application of U.S. Ser. No. 09/638,409 filed Aug. 11, 2000, now abandoned which claims rights of priority from U.S. Provisional Patent Application Ser. No. 60/213,700 filed Jun. 23, 2000.

TECHNICAL FIELD

The present invention is directed to a silicone composition, more specifically, to a silicone pressure sensitive adhesive composition that provides high tack and high lap shear strength as well as enabling a broad range of peel adhesion strengths.

BACKGROUND

Commercially available silicone pressure sensitive adhesives ("PSAs") are known for their superior stability characteristics at temperatures above 350° F., compared to organic polymer-based PSA. However, the silicone PSA's improved stability at elevated temperatures, for example, up to temperatures in the range of 500 to 550° F., is typically achieved only at the expense of reduced tack performance, particularly under low contact pressure and at short contact times, see, for example, the silicone PSAs described in U.S. Pat. Nos. 5,441,811 and 5,506,288.

What is needed in the art is a PSA that exhibits high tack and high lap shear strength at high temperatures while retaining a broad range of peel adhesion strength.

SUMMARY OF THE INVENTION

In a first aspect, the present invention is directed to a silicone composition comprising the condensation product of:

(a) a silanol-functional silicone resin, said resin comprising M structural units according to the formula $R^1_3SiO_{1/2}$, wherein each $R^1$ is independently hydroxy or a monovalent hydrocarbon radical, and Q structural units according to the formula $SiO_{4/2}$ in a ratio of M units to Q units of less than 1.1:1, (b) a silanol-functional polydiorganosiloxane gum, and (c) a crosslinker.

In a second aspect, the present invention is directed to a method for providing a pressure sensitive adhesive composition, comprising condensing, at an elevated temperature in the presence of a base catalyst, a silanol-functional silicone resin, a silanol-functional polydiorganosiloxane gum and a crosslinker.

In a third aspect, the present invention is directed to an article, comprising a substrate and a layer of a silicone composition disposed on at least a portion of at least one surface of the substrate, said silicone composition comprising the condensation product of a silanol-functional silicone resin, said resin comprising M structural units according to the formula $R^1_3SiO_{1/2}$, wherein each $R^1$ is independently hydroxy or a monovalent hydrocarbon radical, and Q structural units according to the formula $SiO_{4/2}$ in a ratio of M units to Q units of less than 1.1:1, a silanol-functional polydiorganosiloxane gum and a crosslinker.

In a fourth aspect, the present invention is directed to method for making an article, comprising applying a layer of a silicone composition on at least a portion of at least one surface of a substrate, said silicone composition comprising the condensation reaction product of a silanol-functional silicone resin, said resin comprising M structural units according to the formula $R^1_3SiO_{1/2}$, wherein each $R^1$ is independently hydroxy or a monovalent hydrocarbon radical, and Q structural units according to the formula $SiO_{4/2}$ in a ratio of M units to Q units of less than 1.1:1, a silanol-functional polydiorganosiloxane gum and a crosslinker.

The composition of the present invention provides a silicone PSA that exhibits high probe tack and high lap shear strength at high temperatures while retaining a broad range of peel adhesion strength.

DETAILED DESCRIPTION OF THE INVENTION

In a preferred embodiment, the composition comprises, based on 100 parts by weight ("pbw") of the composition, from 30 pbw to 80 pbw, more preferably from 35 pbw to 75 pbw and even more preferably from 65 pbw to 75 pbw of the silicone resin, from 20 pbw to 70 pbw, more preferably from 25 pbw to 65 pbw and even more preferably from 25 pbw to 35 pbw of the polydiorganosiloxane gum, and from 0.1 pbw to 5.0 pbw, more preferably from 0.5 pbw to 5.0 pbw and even more preferably from 0.5 pbw to 4.0 pbw of the crosslinker. In a preferred embodiment, the relative amount of resin and gum is from about 1.2 to 2.0, more preferably 1.2 to 1.8, pbw resin per pbw gum. The PSA composition may optionally comprise a volatile organic solvent in an amount of from 10 to 70 pbw, more preferably from 20 to 60 pbw of the total of the resin and gum composition.

Silicone resins suitable as the silanol-functional silicone resin of the present invention are those silicone resins containing a non-zero amount of silicon bonded hydroxy or "silanol" groups, preferably having silanol content of from about 0.2% to about 5%, more preferably from about 1% to about 3%, and even more preferably from about 1.5% to about 2.5% by weight, based on the weight of such hydroxyl substituents and the total weight of the resin.

In a preferred embodiment, the silanol-functional silicone resin is a MQ resin. MQ resins are generically known in the art and contain M units, represented by the formula $R^1_3SiO_{1/2}$ and Q units, represented by the formula $SiO_{4/2}$. It is recognized that while the MQ resins are primarily made from M and Q units, there can be up to 5 mole percent of D units represented by the formula $R^2_2SiO_{2/2}$ and T units, represent by the formula $R^3SiO_{3/2}$, wherein each $R^1$, $R^2$ and $R^3$ is independently hydroxyl or a monovalent hydrocarbon radical. Examples of preferred monovalent hydrocarbon radical include those monovalent hydrocarbon radicals having from about 1 to about 6 carbon atoms, such as alkyl radicals including methyl, ethyl, and isopropyl; alkenyl radicals including ethylene, propenyl, and hexenyl; cycloaliphatic radicals such as cyclopentyl cyclohexenyl; olefinic-containing radicals such as vinyl and allyl; and olefinic-containing radicals. Preferably, the monovalent hydrocarbon radical is methyl.

In a preferred embodiment, the silanol-functional silicone resin has a ratio of M units to Q units (an "M/Q ratio") of less than 1.1:1, more preferably from about 0.8:1 to less than 1.1:1, still more preferably from about 0.8:1 to about 1.0:1. Silanol-functional silicone resin bends having an M:Q ratio within a preferred range may be prepared by blending silicone MQ resins, one or more of which may individually have an M/Q ratio outside the preferred range.

In a preferred embodiment, the silanol-functional silicone resin comprises one or more compounds of the structural formula (I):

$$(M_w D_x T_y Q_z)_{z'} \qquad (I)$$

wherein:
M is $R^1_3SiO_{1/2}$;
D is $R^2_2SiO_{2/2}$;
T is $R^3SiO_{3/2}$;
and Q is $SiO_{4/2}$
each $R^1$, $R^2$ and $R^3$ is independently hydroxy or a monovalent hydrocarbon radical, provided that the resin has a silanol content of 0.2% to about 5% by weight, and
w, x, y, z and z' are each numbers wherein w and z are each greater than 0 are chosen to provide an M/Q ratio from about 0.8:1.0 to less than 1.1:1.0, z' is such that a solution of about 60 percent by weight ("wt %") resin solids in toluene exhibits a viscosity of from 2 to 20 centiStokes ("cSt"), more preferably from 4 to 15 cSt, even more preferably from 5 to 12 cSt, wherein the quantity$((x+y)/(w+x+y+z))$ is less than 0.3.

Suitable hydrocarbon groups include acyclic hydrocarbon radicals, alicyclic hydrocarbon radicals and aromatic hydrocarbon radicals. Preferred hydrocarbon radicals are alkyl radicals, aryl radicals and aralkyl radicals.

As used herein, the terminology "acyclic hydrocarbon radical" means a straight chain or branched hydrocarbon radical, preferably containing from 1 to 60 carbon atoms per radical, which may be saturated or unsaturated and which may be optionally substituted or interrupted with one or more atoms or functional groups, such as, for example, carboxyl, cyano, hydroxy, halo and oxy. Suitable monovalent acyclic hydrocarbon radicals include, for example, alkyl, alkenyl, alkynyl, hydroxyalkyl, cyanoalkyl, carboxyalkyl, alkyloxy, oxaalkyl, alkylcarbonyloxaalkylene, carboxamide and haloalkyl, such as, for example, methyl, ethyl, sec-butyl, tert-butyl, octyl, decyl, dodecyl, cetyl, stearyl, ethenyl, propenyl, butynyl, hydroxypropyl, cyanoethyl, butoxy, 2,5,8-trioxadecanyl, carboxymethyl, chloromethyl and 3,3,3-fluoropropyl.

As used herein, the term "$(C_1-C_6)$alkyl" means a linear or branched alkyl group or fluoro containing alkyl group from 1 to 6 carbons per group, such as, for example, methyl, ethyl, propyl, iso-propyl, n-butyl, iso-butyl, sec-butyl, tert-butyl, pentyl, hexyl, preferably methyl.

As used herein, the terminology "alicyclic hydrocarbon radical" means a radical containing one or more saturated hydrocarbon rings, preferably containing from 4 to 12 carbon atoms per ring, per radical which may optionally be substituted on one or more of the rings with one or more alkyl radicals, each preferably containing from 2 to 6 carbon atoms per alkyl radical, halo radicals or other functional groups and which, in the case of a monovalent alicyclic hydrocarbon radical containing two or more rings, may be fused rings. Suitable monovalent alicyclic hydrocarbon radicals include, for example, cyclohexyl and cyclooctyl.

As used herein, the terminology "aromatic hydrocarbon radical" means a hydrocarbon radical containing one or more aromatic rings per radical, which may, optionally, be substituted on the aromatic rings with one or more alkyl radicals, each preferably containing from 2 to 6 carbon atoms per alkyl radical, halo radicals or other functional groups and which, in the case of a monovalent aromatic hydrocarbon radical containing two or more rings, may be fused rings. Suitable monovalent aromatic hydrocarbon radicals include, for example, phenyl, tolyl, 2,4,6-trimethylphenyl, 1,2-isopropylmethylphenyl, 1-pentalenyl, naphthyl, anthryl. As used herein, the term "aralkyl" means an aromatic derivative of an alkyl group, preferably a $(C_2-C_6)$alkyl group, wherein the alkyl portion of the aromatic derivative may, optionally, be interrupted by an oxygen atom, such as, for example, phenylethyl, phenylpropyl, 2-(1-naphthyl)ethyl, preferably phenylpropyl, phenyoxypropyl, biphenyloxypropyl.

In a preferred embodiment, the monovalent hydrocarbon radical is a monovalent $(C_1-C_6)$alkyl radical, most preferably, methyl.

Suitable silicone resins are made by methods known in the art, such as, for example, the method disclosed in U.S. Pat. No. 2,676,182 to Daudt et al. discloses a method in which a silica hydrosol is reacted under acidic conditions with a source of triorganosiloxy units such as hexaorganodisiloxane, e.g., hexamethyldisiloxane, or hydrolyzable triorganosiloxane, e.g. trimethylchlorosiloxane or mixtures thereof, and recovering a benzene soluble resin copolymer having M and Q units, and are commercially available, for example, the MQ resin is commercially available in solution form in a solvent such as xylene or toluene, generally at a 40% to 60% by weight solution.

Silicone gums suitable as the silanol-functional silicone gum component of the present invention are those silanol-functional polyorganosiloxanes having a viscosity from about 350,000 centiPoise (cps) to about 200,000,000 centipoise at 25° C. Gum viscosity may be characterized using, e.g., using a viscosity meter such as a Rheometrics rheometer.

In a preferred embodiment, the silanol-functional silicone gum comprises one or more silanol-terminated silicone compounds of the structural formula (II):

$$M'_a D'_b T'_c Q'_d \qquad (II)$$

wherein:
M' is $R^4_3SiO_{1/2}$;
D' is $R^5_2SiO_{2/2}$;
T' is $R^6SiO_{3/2}$;
and Q' is $SiO_{4/2}$
each $R^4$, $R^5$ and $R^6$ is independently hydroxy or a monovalent hydrocarbon radical, provided that at least one $R^4$ substituent per M' unit is hydroxy, and
a, b, c and d are integers effective to provide a gum which exhibits a viscosity from about 350,000 to about 200,000,000 centipoise ("cps") at 25° C., more preferably, a viscosity from about 750,000 cps to about 2,000,000 cps.

Suitable monovalent hydrocarbon groups include monovalent acyclic hydrocarbon radicals, alicyclic hydrocarbon radicals and aromatic hydrocarbon radicals. Preferred hydrocarbon radicals are alkyl radicals, monovalent aryl radicals and aralkyl radicals.

In a preferred embodiment, one $R^4$ substituent per M' group is hydroxyl and each of the remaining $R^4$ substituents and each $R^5$ and $R^6$ is independently alkyl, aryl or aralkyl. In a more highly preferred embodiment, one $R^4$ substituent per M' group is hydroxyl and each of the remaining $R^4$ substituents and each $R^5$ and $R^6$ is independently methyl, phenyl or phenylpropyl.

Suitable polydiorganosiloxane gums are known and are commercially available. For example, the polydiorganosiloxanes can be prepared according to the method disclosed in U.S. Pat. No. 2,814,601, herein incorporated by reference, wherein an appropriate siloxane is reacted with an aqueous acid in a closed system until the viscosity of the siloxane has become essentially constant. The product is then washed free of acid.

Compounds suitable for use as the polyalkoxysilane crosslinker of the present invention are those silane compounds with an alkoxy group on the silicon atom.

In a preferred embodiment, the crosslinker of the present invention comprises one or more of:
silanes according to structural formula III:

$$R^7{}_4Si \qquad (III)$$

wherein each $R^7$ is independently hydroxy, alkoxy, preferably ($C_1$–$C_6$)alkoxy, or a monovalent ($C_1$–$C_{15}$) hydrocarbon radical, provided that at least two $R^7$ substituents per molecule of the silane compound are each hydroxy or alkoxy, poly(siloxanes) having structural units according to formula (IV):

$$R^8{}_2SiO_{2/2} \qquad (IV)$$

wherein each $R^8$ is independently hydroxy, alkoxy, preferably ($C_1$–$C_6$)alkoxy, and poly(alkoxysiloxane-alkoxytitanate) copolymers containing first structural units according to formula (IV) and second structural units according to formula (V):

$$R^9{}_e TiO_{4-e/2} \qquad (V)$$

wherein each $R^9$ is independently hydroxy or alkoxy, preferably ($C_1$–$C_6$)alkoxy and e is an integer from 0 to 2.

In a preferred embodiment, the crosslinker is dimethyldiethoxysilane, methyltriethoxysilane, a poly(diethoxysiloxane) or a poly(diethoxysiloxane-diethoxytitanoate) copolymer.

In a preferred embodiment, the composition of the present invention further comprises a volatile organic solvent or a mixture of solvents. As used herein, "volatile organic solvent" means any non-aqueous solvent or carrier having a boiling point above 30° C. Examples of volatile organic solvents include volatile liquid hydrocarbon solvents such as volatile paraffinic hydrocarbons, e.g. pentane, the iso-pentanes, cyclopentane, hexane, the iso-hexanes, cyclohexane, heptane, the iso-heptanes, cycloheptane, octane, the iso-octanes, cyclo-octane and the like; volatile aromatic solvents such as benzene, toluene, the various xylenes, mesitylene and the like are examples of suitable hydrocarbon solvents that may be used. It is also possible to utilize low molecular weight oxygen containing solvents such as alcohols, ketones, aldehydes and the like. Additional non-reactive volatile solvents that may be employed may be selected from the group consisting of:

(1) cyclic diorganosiloxanes having the formula (VI):

$$(R^{10}{}_2SiO)_p, \qquad (VI)$$

wherein $R^{10}$ is a monovalent hydrocarbon radical having from one to ten carbon atoms, preferably one to eight, more preferably one to six, and most preferably one to four carbon atoms; and p is an integer having values ranging from three to eight and (2) linear volatile silicones having the formula (VII):

$$(R^{11}{}_3SiO_{1/2})(R^{12}{}_2SiO_{2/2})_q(R^{13}{}_3SiO_{1/2}) \qquad (VII)$$

wherein each $R^{11}$, $R^{12}$ and $R^{13}$ is independently a monovalent hydrocarbon radical having from one to ten carbon atoms, preferably one to eight, more preferably one to six, and most preferably one to four carbon atoms and q is an integer of from 0 to 8.

Additional ingredients known in the art, such as, for example, antioxidants, pigments, stabilizers, fillers, may be added to the composition of this invention if desired. In one embodiment, the silicone composition of the present invention further comprises one or more of other silicone polymers in addition to the above described condensation product and organic polymers, such as, for example, conventional silicone PSA polymers or organic PSA polymers.

The components of the compositions of this invention can be mixed in any manner such as in bulk or in organic solvent. Since the MQ resin is a solid and is conveniently prepared and handled in an organic solvent, the preparation of the composition of this invention preferably uses a volatile organic solvent for the mixing of the MQ resin and silicone gum. The mixing of the components can be accomplished by any of the techniques known in the art, such as milling, blending, stirring, and the like, either in batch or in continuous process.

In a preferred embodiment, the silicone composition of the present invention is prepared by subjecting a mixture of the silicone resin, silicone gum, crosslinker to condensation conditions in the presence of a base catalyst. Preferably, the mixture is heated to a temperature of from about 110 to 130° C., for example, by refluxing a mixture of the silicone resin, silicone gum, crosslinker, base catalyst and an organic solvent, such as, for example, toluene, for about one to three hours to condense the resin, gum and crosslinker In an even more highly preferred embodiment, a mixture of the silicone resin, silicone gum, crosslinker, base catalyst and an organic solvent is heated to a temperature of from about 60 to 80° C. for 2 to 4 hours. Water is added to the mixture, in molar excess based on moles of alkoxy groups of the reactants, and the resulting mixture is heated and mixed, in a preferred example, for about 1 hour, to allow hydrolysis of any remaining alkoxy groups. The reaction mixture is then heated to a temperature of from about 110 to 130° C. for about 1 to 3 hours to complete the condensation reaction.

The water formed during the condensation reaction is removed and the resulting condensation product is cooled, its solids content is adjusted, and the mixture is neutralized with acid.

Suitable base catalysts for silanol/alkoxysilane condensation reactions are known and include, for example, alkali metal hydroxides, e.g., sodium hydroxide, potassium hydroxide and the like; an aminofunctional silanes such as those disclosed in U.S. Pat. No. 4,906,695 to Blizzard et al., which is hereby incorporated by reference. Suitable aminofunctional silanes include, for example, N-gamma-aminopropyltriethoxysilane, N-beta-aminoethyl-gamma-amino-isobutyltrimethoxysilane, and N-beta-aminoethyl-gamma-aminopropyltrimethoxysilane.

In a preferred embodiment, the base catalyst is sodium hydroxide, preferably in the form of an aqueous solution. The amount of base catalyst should be in the range of about 3 ppm to about 30 ppm, preferably about 8 ppm to about 20 ppm, based on the combined weight of the resin and gum.

In a preferred embodiment, the base catalyzed condensation reaction product mixture is neutralized by addition of an acid. Suitable acids for neutralizing the condensed mixture include mineral acids, such as hydrochloric acid, phosphoric acid, and the like and organic acids such as acetic acid, acetyl chloride, and the like, preferably phosphoric acid.

In a preferred embodiment, the silicone composition of the present invention further comprises free radical curing agent. Suitable free radical curing agents are those compounds that, upon thermal or radiation exposure, generate radicals which cause cure or crosslinking reactions within the silicone composition. Suitable free radical curing agents include, for example, peroxides and azo compounds. Specific peroxides include, for example, acetyl and benzoyl peroxide, cumyl peroxide, 2,4-dichlorobenzoyl peroxide. The amount of cure catalyst is generally an amount effective to cause the cure or crosslinking of silicone adhesive and is typically about 0.5 to about 3.0% by weight of silicone composition solids.

The silicone composition of this invention is useful as a pressure sensitive adhesive for adhering a first substrate to a second substrate.

The silicone composition is applied to at least a portion of a surface of a first substrate in any convenient manner such as by roll coating, by knife-over-roll coating and the like, by dipping the base member in solution, or by brushing or spraying solution on the surface. In a preferred embodiment, wherein the silicone composition comprises a free radical cure agent, the layer of silicone composition is then cured, for example, by heating to stabilize the layer on the substrate and prevent movement, for example, "creep" of the layer under applied pressure.

The first substrate and second a substrate are subsequently brought together, so that the layer of silicone composition is in between the substrates and in contact with each of the substrates, to bond the substrates together.

The first and second substrates may be any known solid material such as metals, such as, for example, aluminum, silver, copper, iron and their alloys; porous materials such as, for example, paper, wood, leather, and fabrics; polymeric materials such as, for example, polyolefins, such as polyethylene and polypropylene, fluorocarbon polymers such as polytetrafluoroethylene and polyvinylfluoride, polyimide, silicone elastomers, silicone resins, polystyrene, polyamides such as nylon, polyesters and acrylic polymers; painted surfaces; siliceous material such as concrete, bricks, cinderblocks, and glass such as glass cloth. Porous materials such as glass cloth are often impregnated with a substance that will prevent the migration of the PSA from one surface to another surface of the support. It is also well known to chemically treat the surface of fluorocarbon polymer support to enhance the adhesion of a PSA to said surface.

In a preferred embodiment, the first substrate comprises a flat substrate such as, for example, a sheet of paper, a woven or non-woven textile, a polymer film or a metal foil.

Examples of articles made with the silicone composition of the present invention include pressure-sensitive adhesive tapes, labels, emblems and other decorative materials. The composition of the present invention is particularly useful as the adhesive layer of tapes for high temperature, high stress applications, such as for example, slicing tapes for use in splicing rolls of paper in continuous printing processes.

The present invention is further directed to pressure sensitive adhesive formed from the cure of the composition of this invention. In addition, the present invention is directed to articles of manufacture containing a solid support having deposited on at least one surface thereof the pressure sensitive adhesive of this invention. The preferred article of manufacture within the scope of this invention is a pressure sensitive tape containing a flexible material having deposited on at least one surface thereof the pressure sensitive adhesive of this invention.

The following examples are to illustrate the invention and are not to be construed as limiting the claims.

EXAMPLES

Components Used in Examples 1 to 19

| | |
|---|---|
| A | MQ resin solution (60% resin solids in toluene) having a viscosity of about 6.4 cSt, a M/Q ratio of 1.0:1 and a silanol content of about 2.8 wt. %. |
| B | MQ resin solution (60% resin solids in toluene) having a viscosity in the range of from 9.5 to 10.5 centistokes and an M/Q ratio of 0.8:1. |
| C | MQ resin solution (60% resin solids in toluene) having a viscosity of about 6.1 cSt and a M/Q ratio of 1:1. |
| D | MQ resin solution (60% resin solids in toluene) having a viscosity of about 6.2 cSt and a M/Q ratio of 1.0:1. |
| E | Poly(dimethyl-co-diphenyl)siloxane gum having a diphenylsiloxy unit content of about 8 mole percent). |
| F | Polydimethylsiloxane gum blend (blend of a first gum having a viscosity in the range of from 150,000 to 350,000 cp, and a second gum having a viscosity in the range of from 65,000 to 175,000 cp). |
| G | Polydiethoxysiloxane crosslinker, 40–42% $SiO_2$ content (Ethylsilicate 40). |
| H | Poly(diethoxysiloxane-diethoxytitanate) copolymer crosslinker, 92% $SiO_2$, 8% $TiO_2$ content (Gelest). |
| I | Toluene. |
| J | 10% NaOH solution. |
| K | 1% NaOH solution. |
| L | Methyltrimethoxysilane crosslinker. |
| M | MQ resin solution (60% resin solids in toluene) having a viscosity of about 6.5 cSt viscosity and an M/Q ratio of 1.0:1. |
| N | Poly(diethoxysilane) crosslinker, (Gelest, Inc. PSI-023). |
| O | MQ resin solution (60% resin solids in toluene) having a viscosity of about 6.0 cSt and an M/Q ratio of 1.0:1. |
| P | MQ resin solution (60% resin solids in toluene) having a viscosity of about 6.0 cSt and M/Q ratio of 1.0:1. |
| Q | MQ resin solution (60% resin solids in toluene) having a viscosity of about 9.6 centistokes and an M/Q ratio of 0.8:1. |
| R | MQ resin solution (60% resin solids in toluene) having a viscosity of 5.8 cSt and a M/Q ratio of 1.0:1. |

Examples 1 to 4

To a 1 liter reactor, the MQ resin, polydiorganosiloxane gum and polyalkoxysilane crosslinker were charged in the amounts listed in Table 1. For comparative examples 1 and 2, no crosslinker was used. Solvent was added, and the contents were mixed until a homogeneous solution was formed. A solution catalyst and a trace amount of water were charged, and the mixture was heated to a reflux temperature of about 110° C. and held for approximately two hours. The mixture was cooled and then neutralized to slightly acidic with phosphoric acid. Probe Tack, Peel Adhesion and Lap Shear results are shown in Table 2.

TABLE 1

| | Ex. 1 (Comp.) Type | Amt. (Grams) | Ex. 2 (Comp.) Type | Amt. (Grams) | Ex. 3 Type | Amt. (Grams) | Ex. 4 Type | Amt. (Grams) |
|---|---|---|---|---|---|---|---|---|
| MQ resin | A | 310 | A | 155 | A | 310 | A | 155 |
| | | | B | 155 | | | B | 155 |
| Gum | E | 128.3 | E | 128.3 | E | 128.3 | E | 128.3 |
| Crosslinker | None | 0 | None | 0 | G | 5.7 | G | 5.7 |
| Solvent | I | 132 | I | 132 | I | 132 | I | 132 |

TABLE 1-continued

| | Ex. 1 (Comp.) Type | Amt. (Grams) | Ex. 2 (Comp.) Type | Amt. (Grams) | Ex. 3 Type | Amt. (Grams) | Ex. 4 Type | Amt. (Grams) |
|---|---|---|---|---|---|---|---|---|
| Catalyst | J | 0.075 | J | 0.075 | J | 0.075 | J | 0.075 |
| Mixture % Solids | | 56.1 | | 55.6 | | 56.6 | | 55.6 |
| Mixture Visc. (centipoise) | | 9920 | | 13,100 | | 13,800 | | 12,000 |

TABLE 2

Performance Properties

| | Example 1 (Comp.) | Example 2 (Comp.) | Example 3 | Example 4 |
|---|---|---|---|---|
| Crosslinker | No | No | Yes | Yes |
| Probe Tack (g/cm²) | | | | |
| A weight | 960 | 602 | 878 | 614 |
| F weight | 1056 | 755 | 922 | 745 |
| Peel Adhesion (oz./in.) | 31 | 37 | 35 | 35 |
| 500° F. Lap Shear Holding Test (1" × 1", 500 gram wt) | 0.5 hr. | 1.0 hr. | 24 hrs. | 24 hrs. |

Performance Testing: To test the adhesion properties (Probe Tack, Peel Adhesion and Lap Shear Strength), the coating formulations were catalyzed with 2% of benzyl peroxide per solids (of total resin and gum) and diluted with toluene to a percent solids of 45%. The catalyzed mixture was coated onto 1 mil polyimide film in an amount equal to approximately 1.5 mil dry adhesive thickness. The probe tack adhesion was measured on a Polyken® Probe Tack instrument at 1.0 cm/sec pull speed with a 1.0 second dwell time. Two different contact pressures were applied—F weight (1000 g/cm²) and A weight (100 g/cm²). The high temperature lap shear strength was tested by preparing a 1 inch×1 inch area of adhesive tape using 1 mil Kapton® polyimide, 1.4–1.7 mils dry adhesive build to steel to form a laminate, applying a 500 gram weight to the adhesive strip, then placing the laminate into a forced air oven (at 500° F. or 550° F. as required) until the either the adhesive slipped off of the steel plate, or 24 hours, whichever occurred first. The time in the oven before the adhesive slipped off, or 24 hours, is the lap shear strength. The peel adhesion was measured by performing a 180° peel test of the adhesive against a clean steel plate at a rate of 12 inches per minute.

Examples 5 to 8

To a 1 liter reactor, the MQ resin, polydiorganosiloxane gum and polyalkoxysilane crosslinker were charged in the amounts listed in Table 3. Solvent was added, and the contents were mixed until a homogeneous solution was formed. A solution catalyst and water were charged, and the mixture was heated to a reflux temperature of about 110° C. and held for approximately two hours. The mixture was cooled, isopropanol was added, and then it was neutralized to slightly acidic with phosphoric acid. Probe Tack, Peel Adhesion and Lap Shear results are shown in Table 4.

TABLE 3

| | Ex. 5 Type | Amt. (Grams) | Ex. 6 Type | Amt. (Grams) | Ex. 7 Type | Amt. (Grams) | Ex. 8 Type | Amt. (Grams) |
|---|---|---|---|---|---|---|---|---|
| MQ resin (75/25 or 80/20 mixture) | C B | 225.2 75.1 | C B | 225.2 75.1 | D B | 216.8 54.2 | D B | 155 155 |
| Gum | E | 138.6 | E | 138.6 | F | 101.7 | F | 101.7 |
| Crosslinker | G | 5.8 | G | 5.8 | H | 6.5 | H | 6.5 |
| Solvent | I | 95 | I | 95 | I | 90 | I | 90 |
| Catalyst | K | 0.81 | K | 0.81 | J | 0.07 | J | 0.07 |
| Water | | 0.40 | | 0.80 | | 3.0 | | 3.0 |
| Isopropanol | | 1.10 | | 1.10 | | 0.80 | | 0.80 |
| Mixture % Solids | | 60.2 | | 59.2 | | 60.0 | | 60.0 |

TABLE 4

Performance Properties

| | Example 5 | Example 6 | Example 7 | Example 8 |
|---|---|---|---|---|
| Resin/Gum ratio | 1.30 | 1.30 | 1.60 | 1.50 |
| Crosslinker | G | G | H | H |
| Probe Tack (g/cm²) | | | | |
| A weight | 767 | 749 | 519 | 413 |
| F weight | 867 | 799 | 731 | 683 |
| Peel Adhesion (oz./in.) | 27 | 30 | 33 | 29 |
| 500° F. | 24 hrs. | 24 hrs. | 24 hrs. | 24 hrs. |
| 550° F. | 24 hrs. | 24 hrs. | 24 hrs. | <0.5 hr. |
| Lap Shear Holding Test (1"× 1", 500 gram wt.) | | | | |

Examples 9 to 15

Examples 9 to 12 were prepared in the same manner as Examples 5 to 8 discussed previously. Examples 13, 14 and 15 were prepared by repeating the composition of Example 4, except that the crosslinker level was varied, and in Examples 14 and 15, the crosslinker was added after the PSA was made, instead of initially with the resin, gum and solvent. The crosslinker and the PSA were blended at room temperature and tested as described above. Amounts of the components used and performance results of the product are shown in Tables 5 to 7 below.

TABLE 5

|  | Ex. 9 Type | Amt. (Grams) | Ex. 10 Type | Amt. (Grams) | Ex. 11 Type | Amt. (Grams) | Ex. 12 Type | Amt. (Grams) |
|---|---|---|---|---|---|---|---|---|
| MQ resin (mixture) | D | 173.4 | M | 229.3 | O | 232.5 | C | 163.0 |
|  | B | 43.3 | B | 25.0 | B | 77.5 | B | 69.3 |
| Gum | F | 81.4 | F | 101.7 | E | 128.3 | E | 106.6 |
| Crosslinker | L | 4.5 | N | 6.5 | G | 11.4 | G | 12.3 |
| Solvent | I | 90 | I | 90 | I | 132 | I | 118 |
| Catalyst | J | 0.06 | J | 0.07 | K | 0.75 | K | 0.70 |
| Water |  | 3.0 |  | 3.0 |  | 2.3 |  | 0 |
| Isopropanol |  | 0.7 |  | 0.8 |  | 0 |  | 0 |
| Mixture % Solids |  | 60.0 |  | 60.0 |  | 58.3 |  | 55.6 |

TABLE 6

Performance Properties

|  | Example 9 | Example 10 | Example 11 | Example 12 |
|---|---|---|---|---|
| Resin/Gum ratio | 1.60 | 1.50 | 1.45 | 1.30 |
| Crosslinker* | L (2.1 wt. %) | M (2.6 wt. %) | G (3.6 wt. %) | G (5.0 wt. %) |
| Probe Tack (g/cm²) |  |  |  |  |
| A weight | 456 | 300 | 811 | 796 |
| F weight | 672 | 553 | 903 | 861 |
| Peel Adhesion (oz./in.) | 35.5 | 30 | 29 | 27 |
| Lap Shear Holding Test (1"× 1", 500 gram wt) |  |  |  |  |
| 500° F. | 6 hrs. | 5 hrs. | — | 24 hrs. |
| 550° F. | <0.5 hrs. | <0.5 hrs. | 24 hrs. | 24 hrs. |

*per silicone solids

TABLE 7

Performance Properties

|  | Example 13 | Example 14** | Example 15** |
|---|---|---|---|
| Resin/Gum ratio | 1.50 | 1.30 | 1.28 |
| Crosslinker* | G (7.5 wt. %) | G (3.6 wt. %) | C (4.5 wt. %) |
| Probe Tack (g/cm²) |  |  |  |
| A weight | 610 | 687 | 764 |
| F weight | 736 | 720 | 815 |
| Peel Adhesion (oz./in.) | 39 | 38 | 28 |
| 500° F. | 24 hrs. | 24 hrs. | 24 hrs. |
| 550° F. Lap Shear Holding Test (1"× 1", 500 gram wt) | 24 hrs. | — | — |

*per silicone solids
**For Example 14, 1.0 g of crosslinker G was added to 50.0 g of the adhesive of Example 4, and blended at room temperature. For Example 15, 1.0 g of crosslinker G was added to 40.0 g of the adhesive of Example 4 (with the resin/gum ratio adjusted to 1.28), and blended at room temperature.

Example 16

This example illustrates that an adhesive prepared according to the invention can be blended with a commercial adhesive to impart improved lap shear properties.

A composition similar to that of Example 4 was made as follows. To a 1 liter reactor, the following ingredients were charged: 212.4 grams of resin solution P; 70.8 grams of resin Q; 126,8 grams of gum F; 6.9 grams of crosslinker G; 93.9 grams of solvent I; and 0.08 grams of catalyst J. The components were mixed and the mixture was heated to approximately 70° C. for four hours, 3.0 g water were then added, mixing was continued for 1 hr and the mixture was then refluxed at about 110° C. for 2 hours. The mixture was then cooled and 0.1 g of a 10% solution of phosphoric acid was added, yielding an adhesive with a viscosity of 24,800 centipoise at 59.8 wt % solids.

A commercially available PSA (56.0 wt % solids) was blended in varying amounts with the above adhesive and tested in the same manner as the previous examples. Results are shown in Table 8.

TABLE 8

Performance Properties of PSA Blend

|  | 16A | 16B | 16C | 16D | Comparative Example |
|---|---|---|---|---|---|
| PSA of Example 16 | 50.0 grams | 37.5 grams | 25.0 grams | 12.5 grams | — |
| Commercial PSA | — | 13.6 grams | 27.3 grams | 40.9 grams | 50 grams |
| Probe Tack (g/cm$^2$) | 756 | 617 | 599 | 568 | 512 |
| A weight | 848 | 925 | 805 | 745 | 658 |
| F weight | 27 | 20 | 24 | 26 | 27 |
| Peel Adhesion (oz./in.) |  |  |  |  |  |
| Lap Shear Holding Test (1" × 1", 500 gram wt) 550° F. | >24 hours | >24 hours | >24 hours | 6 hours | 1.5 hours |

Examples 17 to 19

Examples 17 to 19 compare methyl PSAs made by the conventional process (no crosslinker) with methyl PSAs of the invention at different crosslinker levels. Examples 17 to 192 were prepared in the same manner as Examples 5 to 8 discussed previously. Amounts of the components used and performance results of the product are shown in Tables 9 and 10 below.

TABLE 9

Amounts of Components

| | Ex. 17 Type | Amt. (Grams) | Ex. 18 Type | Amt. (Grams) | Ex. 19 Type | Amt. (Grams) |
|---|---|---|---|---|---|---|
| MQ resin | R | 1197.8 | C | 237.3 | C | 237.3 |
| Gum | F | 410.6 | F | 86.3 | E | 86.3 |
| Crosslinker |  | 0 | G | 10.2 | G | 3.3 |
| Solvent | I | 389.9 | I | 98.8 | I | 98.8 |
| Catalyst | J | 0.36 | J | 0.06 | K | 0.06 |
| Isopropanol |  | 0 |  | 0.70 |  | 0.70 |
| Mixture % Solids |  | 55.0 |  | 57.5 |  | 57.1 |

TABLE 10

Performance Properties

| | Example 17 | Example 18 | Example 19 |
|---|---|---|---|
| Resin/Gum ratio | 1.70 | 1.65 | 1.65 |
| Crosslinker* | None | G (4.5 wt. %) | G (1.4 wt. %) |
| Probe Tack (g/cm$^2$) |  |  |  |
| A weight | 839 | 630 | 784 |
| F weight | 934 | 862 | 874 |
| Peel Adhesion (oz./in.) | 37.5 | 34.5 | 34.5 |
| 500° F. | 1 hr. (at 450° F.) | 24 hrs. | < 0.5 hrs. |
| 550° F. |  | 24 hrs. | ≦0.25 hrs. |
| Lap Shear Holding Test (1"× 1", 500 gram wt) |  |  | (24 hrs. at 450° F.) |

*per silicone solids

The composition of the present invention provides a silicone PSA that exhibits high probe tack and high lap shear strength at high temperatures while retaining a broad range of peel adhesion strength.

What is claimed is:

1. A method for providing a pressure sensitive adhesive composition, comprising condensing, at an elevated temperature in the presence of a base catalysts a silanol-functional silicone resin, said resin comprising M structural units according to the formula $R^1_3SiO_{1/2}$, wherein each $R^1$ is independently hydroxy or a monovalent hydrocarbon radical, and Q structural units according to the formula $SiO_{4/2}$ in a ratio of M units to Q units of less than 1.1:1, a silanol-functional polydiorganosiloxane gum and a crosslinker selected from the group consisting of alkoxysilane and poly(alkoxysilane).

2. The method of claim 1, wherein the elevated temperature is from about 110 to 130° C.

3. A method for providing a pressure sensitive adhesive composition, comprising condensing, at an elevated temperature in the presence of a base catalyst, a silanol-functional silicone resin, said resin comprising M structural units according to the formula $R^1_3SiO_{1/2}$, wherein each $R^1$ is independently hydroxy or a monovalent hydrocarbon radical, and Q structural units according to the formula $SiO_{4/2}$ in a ratio of M units to Q units of less than 1.1:1; a silanol-functional polydiorganosiloxane gum and a crosslinker comprising:

(a) heating a mixture of the resin, gum, crosslinker, base catalyst and an organic solvent to a first elevated temperature to begin condensation of the resin, gum and crosslinker, (b) adding a molar excess, based on moles of alkoxy groups of the resin, gum and crosslinker of the mixture of step (a), of water to the mixture of step (a), (c) heating the mixture of step (b), to allow hydrolysis of any remaining alkoxy groups, and (d) heating the mixture of step (c) to a second elevated temperature from about 110 to 130° C. to drive condensation of the resin, gum and crosslinker toward completion.

4. The method of claim 3, wherein the mixture of step (a) is heated to a first elevated temperature of from 60 to 80° C. for a time period of from 2 to 4 hours prior to step (b).

5. A method for providing a pressure sensitive adhesive composition, comprising condensing, at an elevated temperature in the presence of a base catalyst, a silanol-functional silicone resin, said resin comprising M structural units according to the formula $R^1_3SiO_{1/2}$, wherein each $R^1$ is independently hydroxy or a monovalent hydrocarbon radical, and Q structural units according to the formula $SiO_{4/2}$ in a ratio of M units to Q units of less than 1.1:1, a silanol-functional polydiorganosiloxane gum, a crosslinker selected from the group consisting of alkoxysilane and poly(alkoxysiloxane), and water.

6. The method of claim 5, wherein the elevated temperature is from about 110 to 130° C.

7. A method for making an article, comprising applying a layer of a silicone composition on at least a portion of at least one surface of a substrate, said silicone composition comprising the condensation reaction product of a silanol-functional silicone resin, said resin comprising M structural units according to the $R^1_3SiO_{1/2}$, wherein each $R^1$ is independently hydroxy or a monovalent hydrocarbon radical, and Q structural units according to the formula $SiO_{4/2}$ in a ratio of M units to Q units of less than 1.1:1, a silanol-functional polydiorganosiloxane gum and a crosslinker selected from the group consisting of alkoxysilane and poly(alkoxysilane).

8. The method of claim 7, comprising:
(a) heating a mixture of the resin, gum, crosslinker, base catalyst and an organic solvent to a first elevated temperature to begin condensation of the resin, gum and crosslinker,
(b) adding a molar excess, based on moles of alkoxy groups of the resin, gum and crosslinker of the mixture of step (a), of water to the mixture of step (a),
(c) heating the mixture of step (b) to allow hydrolysis of any remaining alkoxy groups, and
(d) heating the mixture of step (c) to a second elevated temperature from about 110 to 130° C. to drive condensation of the resin, gum and crosslinker toward completion.

9. The method of claim 7, wherein the mixture of step (a) is heated to a first elevated temperature of from 60 to 80° C. for a time period of from 2 to 4 hours prior to step (b).

10. The method of claim 7, wherein the mixture of step (d) is heated to a second elevated temperature of from about 110 to 130° C. for a time period of from about 1 to 3 hours.

11. A method for making an article, comprising applying a layer of a silicone composition on at least a portion of at least one surface of a substrate, said silicone composition comprising the condensation reaction product of a silanol-functional silicone resin, said resin comprising M structural units according to the $R^1_3SiO_{1/2}$, wherein each $R^1$ is independently hydroxy or a monovalent hydrocarbon radical, and Q structural units according to the formula $SiO_{4/2}$ in a ratio of M units to Q units of less than 1.1:1, a silanol-functional polydiorganosiloxane gum, a crosslinker selected from the group consisting of alkoxysilane and poly(alkoxysilane) and water.

* * * * *